United States Patent Office 3,439,853
Patented Apr. 22, 1969

3,439,853
BACKSTOP EXTENSION FOR FRICTION WELDER
Gerald W. Deemie and Ira H. Sage, Peoria, Ill., assignors to Caterpillar Tractor Co., Peoria, Ill., a corporation of California
Filed Oct. 23, 1967, Ser. No. 677,375
Int. Cl. B23k 27/00
U.S. Cl. 228—2        9 Claims

ABSTRACT OF THE DISCLOSURE

A friction welding machine having a backstop extension assembly for accommodating various long lengths of weld pieces and wherein means are provided for connecting the backstop extension to the main body of the machine, so that large thrust loads experienced during welding are transferred to the framework of the welding machine.

Background of the invention

This invention relates to improvements in friction welding apparatus of the general type wherein two workpieces are subjected to relative rotation while in contact with each other to generate frictional heat to raise the workpieces to a suitable welding temperature, whereupon the relative rotation subsides and the workpieces become bonded to each other.

It is also to be understood that the invention is specifically applicable to apparatus for performing the inertia welding process. In the inertia welding process the energy required to bring the common interface of the parts to a bondable condition is stored as kinetic energy in rotating inertia weights. These weights generally take the form of flywheels and are connected to one of the parts and the entire energy necessary to form the bond is stored in the weights prior to engagement of the parts at the interface. The stored energy is discharged into the interface through frictional heating and plastic working developed at the interface as the rubbing contact slows the rotating weights and the bonding cycle is concluded.

One of the problems associated with most prior art friction welders resides in their general inability to accommodate relatively long workpieces. Thus, most prior art friction welding machines are quite limited with respect to the welding of workpieces such as long bars or tubes.

The friction welding process also involves the application of high axial thrust loads along the longitudinal axes of the workpieces being bonded or welded. Consequently, in order to successfully weld extremely long workpieces it is necessary to provide a strong back-up assembly to withstand the large thrust loads applied to the weld pieces and further to provide a suitable means for attaching the back-up extension assembly to the main body of the friction welding machine in a manner such that the large thrust loads are transferred to the frame of the machine. Further, in order to render the friction welding process attractive in large scale production operations, the backstop extension must be easily adjustable to accommodate workpieces having a wide range of lengths.

An effective backstop extension assembly should also be provided with suitable means for easily removing the weld pieces from the machine after completion of the weld.

Other objects and advantages of the present invention will be apparent from the following description and claims and are illustrated in the accompanying drawings which, by way of illustration, show preferred embodiments of the present invention and the principles thereof and what are now considered to be the best modes contemplated for applying these principles. It is recognized that other embodiments of the invention employing the same or equivalent principles may be used and structural changes may be made by those skilled in the art without departing from the present invention and the purview of the appended claims.

Description of the preferred embodiment

Figure 1:
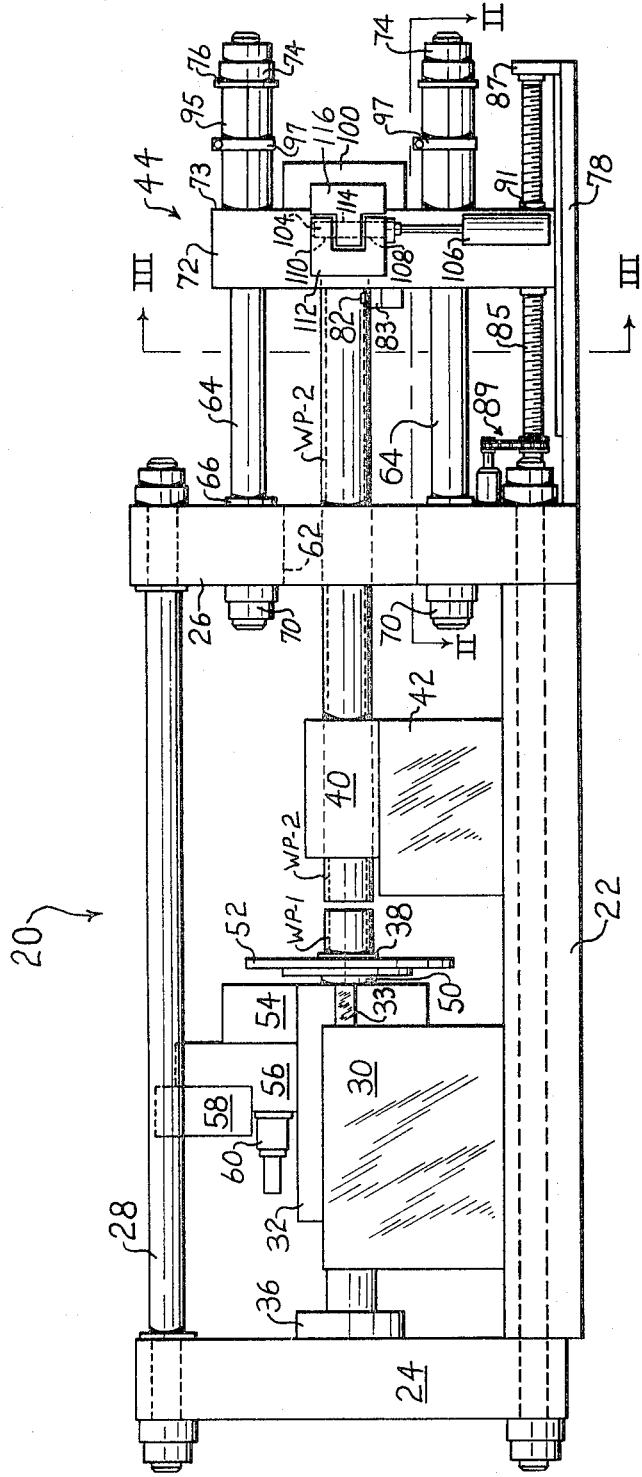
FIG. 1 is a side elevation illustrating one exemplary embodiment of a friction welding machine having a backstop extension assembly constructed in accordance with the present invention.

A friction welding machine constructed in accordance with one exemplary embodiment of the present invention is indicated generally by the reference numeral 20 in FIG. 1. The machine 20 has a main base member 22 which has attached at the ends thereof an upstanding head frame member 24 and a similar upstanding back frame member 26. A plurality of guide bars 28 are utilized to attach the frame members 24 and 26 to each other and to the base member 22 in a manner which provides a very rigid frame structure to which extremely heavy fixed and movable members may be attached.

A spindle guide and support block 30 is rigidly mounted on the machine base 22 at the head frame end of the machine. A spindle carrier 32 is slidably mounted within the spindle support 30 for reciprocal movement along the longitudinal axis of the machine 20. The carrier 32 is provided with longitudinal rail members, one of which is shown at 33 for slidably engaging the support block 30. A conventional ram assembly 36 having its cylinder end attached to the head frame member 24 and its rod end attached to carrier 32 provides the motive force for reciprocating the carrier longitudinally of the fixed guide and support block 30.

The two parts to be welded, workpieces WP-1 and WP-2, are mounted within chucks 38 and 40. The chuck 40 does not rotate and is mounted on a tailstock fixture 42. It will be observed from FIG. 1 that the workpiece WP-2 is extremely long and could not be accommodated by the machine 20 without the use of a backstop extension assembly shown generally at 44. The backstop extension assembly 44 will be described in much greater detail at a later point in the specification.

The chuck 38 is mounted on a spindle 50, and the chuck and spindle are mounted for rotation within the carrier 32. The rotary spindle is adapted to receive flywheels 52 which may be of various size and mass depending upon the particular application of the machine. Mounted upon the carrier 32 are suitable drive train elements for imparting rotation to the spindle 50 which drive train includes motor means 54, a transmission 56, speed change gears 58, and a suitable mechanism 60 such as a clutch or hydraulic ram for engaging and disengaging the spindle 50.

It is to be understood that the flywheel weights 52 are mounted on the spindle 50 so that the welding machine 20 can be operated as an inertia welding machine as described in United States Patent No. 3,273,233 and as described in further detail below.

A welding operation to join a first workpiece to a second workpiece can be performed by operating the machine in the following manner. One of the weld pieces, WP–1, is firmly clamped in the rotatable chunk 38 located on the spindle 50. The other workpiece, WP–2, is firmly clamped in the nonrotatable chuck 40 which is located on the tailstock fixture 42 of the machine. Upon actuation of the motor 54, the flywheels 52 and the workpiece WP–1 are accelerated to a predetermined velocity.

Once the predetermined velocity has been attained, the motor 54 is disconnected or shut down and the ram mechanism 36 is actuated to move the carrier 32 and rapidly rotating workpiece WP–1 into contact with the stationary workpiece WP–2. As the two workpieces are brought into contact under the upsetting pressure applied by ram 36, heat is generated at the contacting surface or interface of the weld pieces. This heating increases until the workpieces have reached the weld temperature, at which time the upsetting pressure, applied by the ram 36, at either a constant or varying pressure, causes flashing or upsetting to occur. During this heating and flashing, the rotational velocity of the spindle member 50 has continued to decrease. At the time the rotation of the spindle ceases upsetting has taken place and the weld is completed.

Referring now to the specific structure of the backstop extension assembly 44 it will be noted that the back frame member 26 is provided with an aperture 62 for receiving an unusually long workpiece WP–2. The backstop extension 44 comprises a plurality and preferably four rectangularly-spaced tie bars 64, two of which are shown in FIG. 1.

Figure 2:
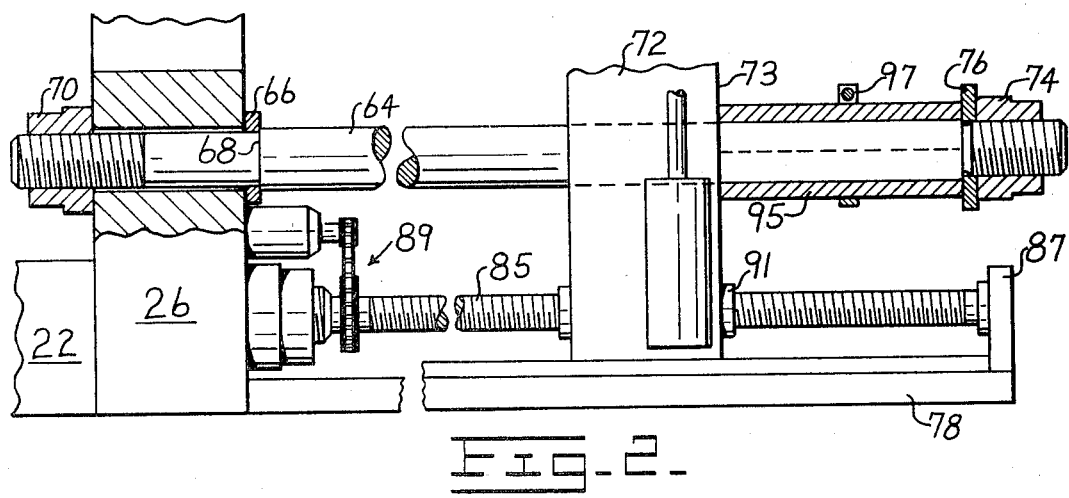
FIG. 2 is a cross-sectional view taken on the line II—II of FIG. 1.

As shown in FIGS. 1 and 2, one end of each tie bar 64 is passed through a hole in the upstanding back frame member 26 after a flange or washer 66 has been passed over each tie bar 64 and abuts against an annular shoulder 68, formed on the tie bar. The tie bars 64 are then secured to the frame member 26 by large nuts 70 which thread onto the ends of each tie bar and tighten against the face of member 26.

The other end of each tie bar 64 passes through an aperture formed in a back-up carrier member 72 of the backstop assembly and a nut 74 having a flange or washer 76 is threaded onto the end of tie bar 64 to limit travel of the carrier 72 outwardly along said tie bars.

It should be observed that the aforementioned elements of the backstop extension assembly 44 are constructed in a manner such that the assembly is securely fastened to the welding machine 20 and any thrust force applied to the extension assembly is, in turn, transferred to the welding machine frame.

The lower portion of carrier member 72 is received and supported on at least one rail member 78 which extends outwardly from the welding machine 20. The connection between the lower portion of the carrier 72 and the rail member 78 may take any suitable form such as the slidable connection shown at 79 in FIG. 3 or the rolling connection shown by the pins 80 and roller elements 81 in FIG. 4.

Figure 3:
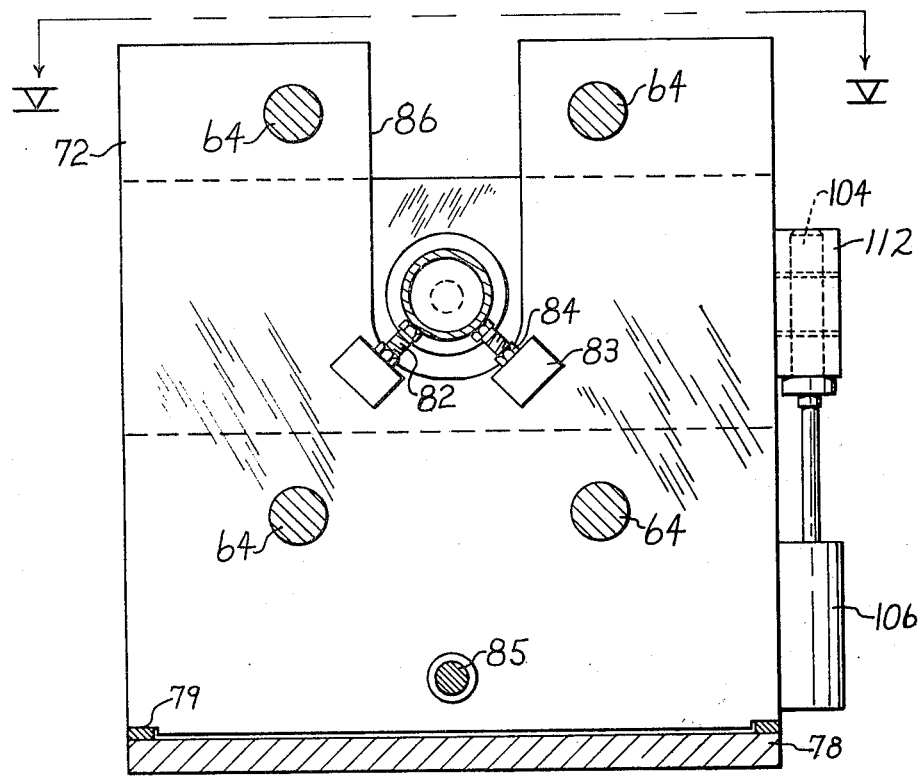
FIG. 3 is a cross-sectional view taken on the line III—III of FIG. 1.
Figure 4:
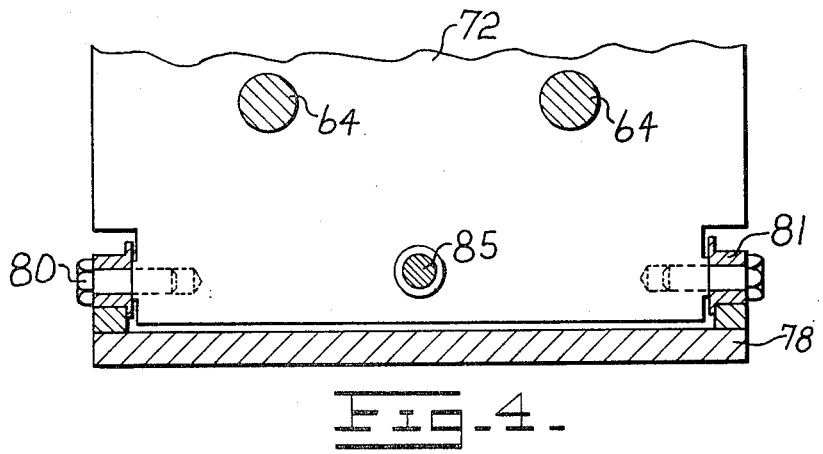
FIG. 4 is a cross-sectional view of a modified embodiment of a portion of the backstop extension assembly; and, FIG. 5 is a top view partially in section of the rearward portion of the backstop extension assembly.

As best shown in FIG. 3 the front face of the carrier 72 is provided with large headed bolt members 82 which are threadedly received in blocks 83. The bolt members 82 may be adjusted with respect to the blocks 83 by means of jam nuts 84. Thus, the large headed bolt members may be used to vertically support the end portion of a long workpiece WP–2 within a U-shaped cavity 86 formed in the carrier 72.

As best shown in FIGS. 1 and 2 a rotatable screw 85 extends between the frame of welding machine 20 and the outer end 87 of rail member 78. A motor driven chain drive assembly shown generally at 89 is provided for rotating the screw 85 in either a clockwise or counterclockwise direction. The lower portion of carrier 72 is provided with a threaded bushing 91, which threadably receives the screw 85. Thus, the carrier 72 may be moved to any location along the tie bars 64 by actuation of the screw 85.

It is, of course, recognized that means other than a screw drive could be used to move the carrier 72. For example a hydraulic ram assembly could be connected between the frame of the welder 20 and the carrier 72. However, the screw drive herein disclosed is preferred since small movements of the carrier 72 may be easily and accurately controlled.

At this juncture it should be noted that each tie bar 64 also receives a back-up sleeve member 95 having one end which abuts against the back side 73 of carrier 72. The other end of the sleeve abuts against the flange or washer portion 76 of nut member 74. Each sleeve is split into two half sleeve portions which may be clamped securely around its respective tie bar 64 by any suitable means such as a bolt and flange or band assembly indicated at 97.

The back-up sleeve members 95 function to prevent longitudinal travel of the carrier 72 past a given location rearwardly along the tie bars 64 and serve to transmit thrust forces evenly and uniformly back along the tie bars 64 to the main frame of the welding machine 20.

In order to accommodate various long lengths of workpiece WP–2 several sets of sleeves 95 must be provided for the backstop extension assembly 44. These sleeves may be provided in, for example, three increments to establish a rough position for the carrier 72 with respect to a given length of workpiece WP–2. The final contacting position of the backstop extension with the long workpiece WP–2 is provided by an adjustable back-up plate element 118 which will be described in detail at a later point.

Figure 5:
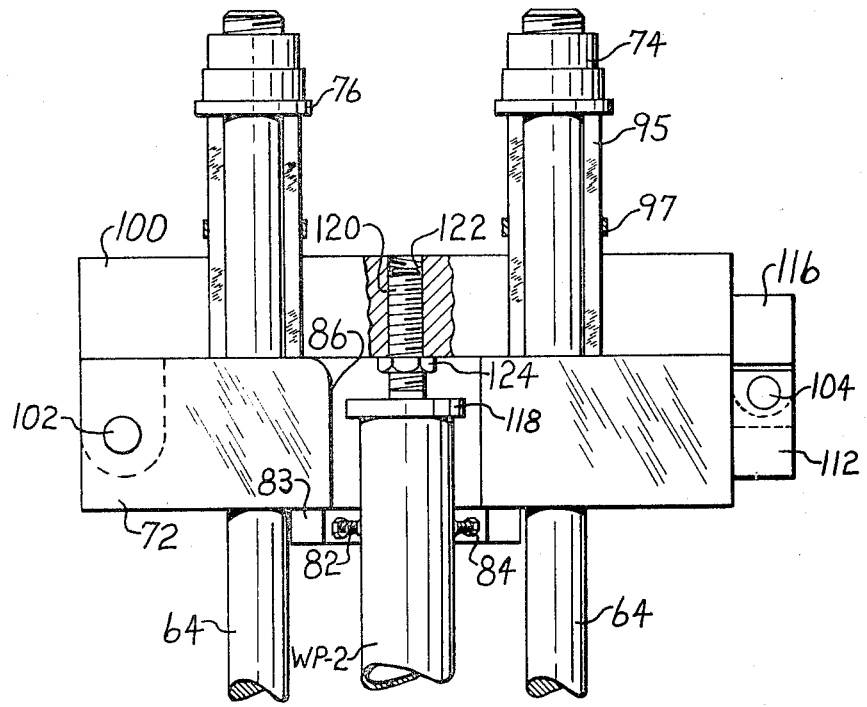

As best shown in FIGS. 1 and 5, a back gate member 100 is hingeably mounted at 102 on the back side of carrier 72. The back gate 100 may be securely closed in the position shown in FIG. 5 by means of a heavy pin 104 which is operated vertically by hydraulic ram 106 to pass through aligned openings 108 and 110 formed in bifurcated element 112 of carrier 72 and an opening 114 formed in a projecting tongue portion 116 of the gate 100. When the gate 100 is swung to open position a workpiece WP–2 may be easily fed into or out of the backstop extension assembly 44.

As previously mentioned, actual back-up contact with the rearward end of workpiece WP–2 is provided by an axially adjustable, large generally circular back-up plate 118. Back-up plate 118 is formed on the end of a heavy bolt member 120 which is threadably received in an opening 122 which is located centrally of the back gate 100. A jam nut 124 may be tightened against the front face of gate 100 to securely lock the back-up plate 118 in position after it has been moved into firm contact with the end of workpiece WP–2.

In operation, after the length of the workpiece WP–2 has been determined, an appropriate set of sleeve elements 95 are attached to the tie bars 64 and the carrier 72 is backed into engagement with the sleeve elements by operation of the screw drive 85 (see FIGS. 1 and 2).

The workpiece is then fed through the carrier portion 72 of the backstop extension and into the chuck 40 of the welding machine whereupon the chuck is actuated to hold the workpiece against rotation. The gate 100 is then swung to its closed position and the ram 106 is actuated to drive the locking pin 104 to the position shown in FIG. 1. Back-up plate 118 is then moved into firm engagement with the end of workpiece WP–2 and the jam nut 124 is threaded into engagement with gate 100 to securely hold the back-up plate in position during a welding operation.

What is claimed is:
1. A friction welding machine comprising, a frame structure; a rotatable and axially movable spindle assembly mounted on said frame structure for rotatably mounting a first workpiece to be welded; a tailstock mounted on said frame structure for holding at least a portion of a second workpiece to be welded; and, a longitudinally adjustable backstop extension assembly received outwardly of the tailstock end of said machine and having a back-up member for abutting the end of said second workpiece to hold said second workpiece against axial thrust loads applied during a friction welding operation.

2. A friction welding machine as set forth in claim 1 wherein said backstop extension comprises a plurality of longitudinally extending tie bars fastened to and extending outwardly of said welding machine frame structure and said back-up member is slidably mounted on said tie bars.

3. A friction welding machine as set forth in claim 2 wherein the outer end portion of each of said tie bars is provided with an annular shoulder for fixedly holding any of a given number of various lengths of sleeve assemblies, said sleeve assemblies having means for contacting said back-up member to prevent movement of said back-up member past said sleeve assemblies in the direction of said annular shoulders.

4. A friction welding machine as set forth in claim 2 wherein said backstop extension further comprises motor driven screw means operable to move said back-up member toward and away from said welding machine frame structure to provide back-up means for various lengths of long weld pieces.

5. A friction welding machine as set forth in claim 4 wherein guide rail means are provided for receiving the lower portion of said back-up member to facilitate longitudinal travel of said back-up member.

6. A friction welding machine as set forth in claim 1 wherein said backstop extension comprises four rectangularly spaced tie bars extending outwardly from said welding machine frame structure, said back-up member comprising a carrier element slidably received on said tie bars and being formed with an open topped generally U-shaped cavity for receiving said second workpiece; and, a back-up plate adjustably mounted on said carrier for engaging the outer end of said second workpiece, said back-up plate being movable out of alignment with the U-shaped cavity of said carrier to permit easy loading and unloading of said second workpiece from the tailstock end of said welding machine.

7. A friction welding machine as set forth in claim 6 wherein the outer end portion of each of said tie bars is provided with an annular shoulder for fixedly holding any of a given number of various lengths of sleeve assemblies, said sleeve assemblies having means for contacting said back-up carrier member to prevent movement of said back-up carrier past said sleeve assemblies in the direction of said annular shoulders.

8. A friction welding machine as set forth in claim 7 wherein said backstop extension further comprises motor driven screw means operable to move said back-up carrier member toward and away from said welding machine frame structure to provide back-up means for various lengths of long weld pieces.

9. A friction welding machine as set forth in claim 8 wherein guide rail means are provided for receiving the lower portion of said back-up carrier member to facilitate longitudinal travel of said back-up carrier.

References Cited
UNITED STATES PATENTS 3,235,157   2/1966   Hollander _____ 228—2

RICHARD H. EANES, Jr., *Primary Examiner.*